(No Model.)
J. KEITH.
AIR RELIEF VALVE.
No. 537,981. Patented Apr. 23, 1895.
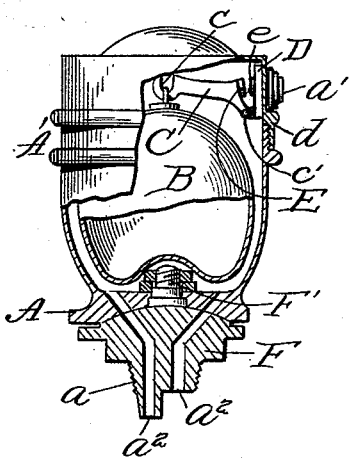
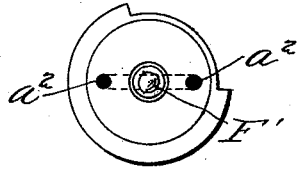

UNITED STATES PATENT OFFICE.

JAMES KEITH, OF LONDON, ENGLAND.

AIR-RELIEF VALVE.

SPECIFICATION forming part of Letters Patent No. 537,981, dated April 23, 1895.

Application filed March 21, 1894. Serial No. 504,538. (No model.) Patented in England February 3, 1893, No. 2,419.

*To all whom it may concern:*

Be it known that I, JAMES KEITH, a subject of the Queen of Great Britain and Ireland, residing at 57 Holborn Viaduct, in the city of London, England, have invented new and useful Improvements in Air-Relief Valves for Venting Hot-Water Boilers, Radiators, Water-Mains, and the Like, (which have not been patented in any country except Great Britain and Ireland by Letters Patent dated February 3, 1893, No. 2,419;) and I do hereby declare that the following is a full, clear, and exact description of the invention, which will enable others skilled in the art or manufacture to which it relates to make and use the same.

This invention has for its object the provision of a simple and reliable automatic relief or venting valve to be applied to hot water boilers, radiators, water mains, service piping and the like for permitting the escape of air therefrom or its admission thereto while preventing outflow of water.

Figure 1 is a view of the device partly broken away and partly in section. Fig. 2 is a bottom plan view of the lower end.

The improved apparatus comprises a casing A the lower end of which is screw threaded at $a$ or formed with a flange for attachment to or over an orifice or orifices tapped in the boiler, radiator, or piping to be vented, while the upper end has fitted over it by screwing or by bolts or other tight joints a removable cap or cover A' in which the venting orifice $a'$ from the casing is preferably situated. The said lower end of the casing comprises a plug F which extends centrally from the casing and is swiveled thereto centrally by the screw F'. Within the casing is placed a small hollow or other float B which is suspended or attached at $c$ to one end of a lever C pivoted in the casing by a pin $c'$ passed through the end of the lever and through wings $d$ on a plate or gland D in which the venting orifice $a'$ is situated and whereon is formed a valve seat $e$ against which closes the valve E which is carried by the lever C.

The valve is pressed against its seat by the buoyancy of the float B acting through the lever C the float being maintained in its highest position so long as the level of the water from the boiler, radiator or pipe and entering the casing A through the orifice or orifices $a^2$ is normal; but on the accumulation of air in the casing the float drops and the valve is drawn off its seat whereupon the accumulated air escapes and the water again rising and buoying up the float causes the valve to close before water can escape by the venting orifice $a'$. In like manner on the withdrawal of water from the boiler, radiator or piping the valve is opened and admits air by the orifice $a'$ to prevent the formation of a partial vacuum the water being prevented from hanging in the casing by the provision of a dividing diaphragm in the orifice $a^2$ or by providing a duplex orifice $a^2$ or two orifices at $a^2$ one branch which carries off the water extending lower than the other which serves as a passage for the air.

It will be seen that when the screw plug F is in place that the upper casing A can be turned about the swiveled connection, and thus the ports $a^2$ may be opened and closed.

Having now described the invention, what I desire to secure by Letters Patent is—

A relief valve comprising a casing, the valve therein and a plug extending centrally from the end of the casing swiveled thereto and having a port therethrough adapted to be opened and closed by turning the casing substantially as described.

In witness whereof I have hereunto set my hand and seal the 2d day of March, 1894.

JAMES KEITH. [L. S.]

Witnesses:
JOHN JACK,
15 *Selborne Rd., Wood Green, N. London.*
WILLIAM C. MEIKLE,
52 *Chaucer Road, Forest Gate, Essex.*